United States Patent [19]

Limberis

[11] Patent Number: 4,948,315
[45] Date of Patent: Aug. 14, 1990

[54] SLIP LOCK PIN AND CAP

[76] Inventor: Andreas A. Limberis, 24BA Norre Gade, St. Thomas, V.I. 00802

[21] Appl. No.: 333,659

[22] Filed: Apr. 5, 1989

Related U.S. Application Data

[63] Continuation-in-part of Ser. No. 29,070, Mar. 23, 1987, abandoned.

[51] Int. Cl.⁵ ............................................. F16B 21/00
[52] U.S. Cl. ...................................... 411/349; 411/910; 24/287; 24/590
[58] Field of Search ............... 24/591, 597, 287, 590, 24/553; 411/349, 549, 553, 554, 555, 910; 403/348, 388, 408.1

[56] References Cited

U.S. PATENT DOCUMENTS

| | | | |
|---|---|---|---|
| 314,671 | 3/1885 | Hellmuth | 24/591 |
| 1,084,408 | 1/1914 | Didierjean | 24/591 |
| 3,065,662 | 11/1962 | Spoehr et al. | 411/910 |
| 3,174,383 | 3/1965 | Heil | 411/910 |
| 3,623,761 | 11/1971 | Nadherny | 411/90 |
| 3,753,272 | 8/1973 | Laidley | 24/287 |
| 3,811,157 | 5/1974 | Schenk | 411/349 |
| 3,956,803 | 5/1976 | Leitner | 411/349 |
| 3,990,131 | 11/1976 | Okamura | 24/590 |
| 4,082,052 | 4/1978 | Looks | 24/287 |
| 4,394,096 | 7/1983 | Stevens . | |
| 4,457,650 | 7/1984 | Tseng | 24/597 |
| 4,613,265 | 9/1986 | Visinand | 411/402 |
| 4,621,230 | 11/1986 | Crouch et al. | 411/910 |
| 4,647,262 | 3/1987 | Yokota | 411/349 |
| 4,652,192 | 3/1987 | Schaller | 411/349 |
| 4,657,462 | 4/1987 | Hoen | 411/349 |
| 4,718,828 | 1/1988 | Breeck et al. | 411/910 |

FOREIGN PATENT DOCUMENTS

| | | | |
|---|---|---|---|
| 2034802 | 1/1972 | Fed. Rep. of Germany | 411/910 |
| 2161626 | 6/1973 | Fed. Rep. of Germany | 24/591 |
| 139624 | 1/1980 | Fed. Rep. of Germany | 403/408 |
| 2836056 | 2/1980 | Fed. Rep. of Germany | 403/408 |
| 2503806 | 10/1982 | France | 403/408 |
| 198999 | 4/1924 | United Kingdom | 24/591 |

Primary Examiner—Gary L. Smith
Assistant Examiner—Eric K. Nicholson
Attorney, Agent, or Firm—William E. Shull

[57] ABSTRACT

A slip lock pin and cap for fastening two or more objects together includes a pin having a body and insertable into aligned openings in the objects. The pin body has protruding locking ears on its ends which engage shoulders in the openings upon rotation of the pin through 90° after insertion into the openings. A cap is then placed over each end of the pin body. The caps have protruding portions which extend into the openings on opposite sides of the pin body and prevent rotation of the locking ears to a position disengaged from the shoulders. The caps have a lip around an opening into which the pin ends extend, and the lip engages a groove in the pin to retain the cap on the pin. A thin walled section of the cap is movable into a recess in the pin end to help rotate the lip out of the groove and release the cap from the pin.

3 Claims, 6 Drawing Sheets

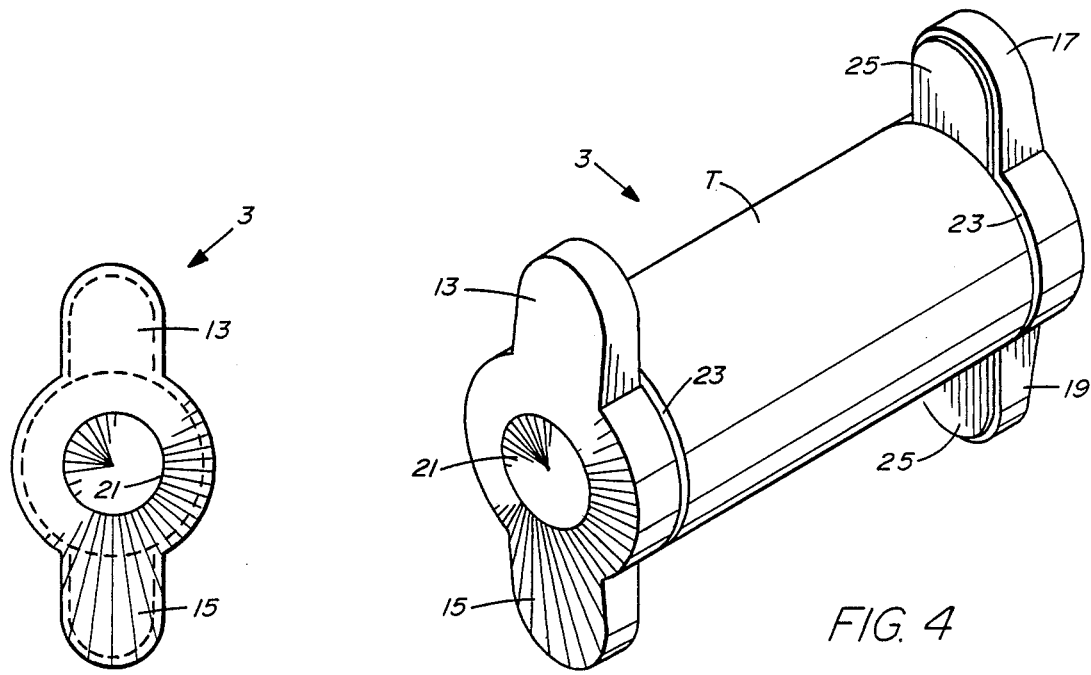
FIG. 1
FIG. 4
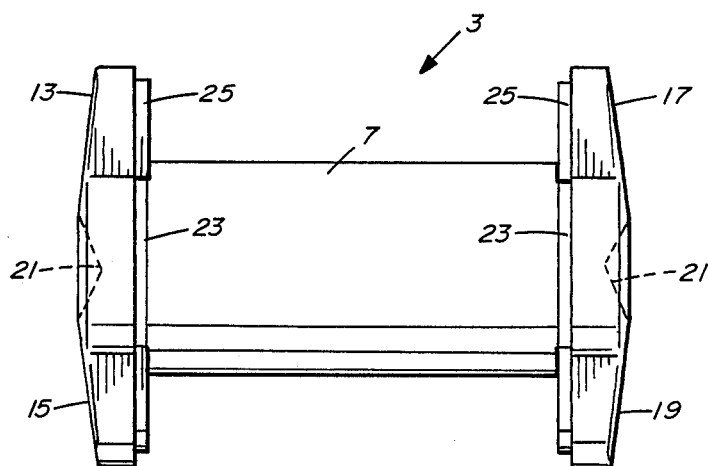
FIG. 2
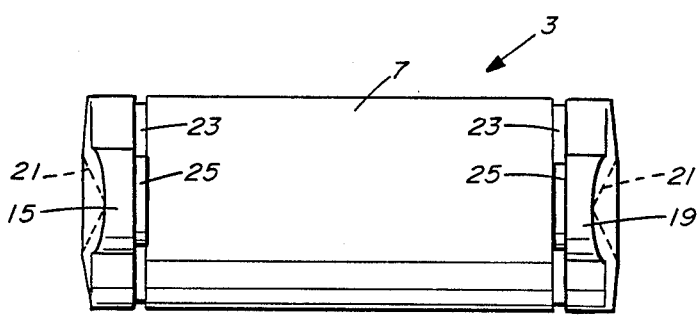
FIG. 3

SLIP LOCK PIN AND CAP

This application is a continuation-in-part of Ser. No. 029070, now abandoned.

BACKGROUND OF THE INVENTION

The present invention relates generally to fasteners, and more particularly to a slip lock pin and cap for fastening two or more juxtaposed objects together. More particularly, the present invention relates to such a fastener having releasable means for establishing a flush-fitting, secure cap on the fastener in relation to the surrounding surface of at least one of the objects being fastened together.

While many conventional fasteners are in use today, such as screws, rivets, bolts and nuts, nails, or welds, use of most of these fasteners requires special treatment with materials such as wood filler, carpenter's putty, and the like on the surfaces of the materials being connected together in order to hide or mask the fasteners. Such masking is required in many cases when conventional fasteners are used in order to improve the appearance of the finished object, for example in the manufacturing of furniture, or the installation of interior paneling or exterior wall coverings such as Masonite siding. Typically, such surface treatments are time-consuming to install, require painting or the like in order to cover them up, and are susceptible to cracking, peeling, and other deterioration.

Sometimes fasteners are used which have plugs or other caps which fit over the ends of the fasteners in receptacles in one of the objects being attached together. Usually, such plugs or caps are either not securely attached, so that they fall off or may be accidentally bumped off easily, or they fit so snugly that they are difficult to remove when it is desired to do so.

Conventional fasteners such as screws and bolts also have drawbacks in that their strength is determined by the strength of their threads, which may be inadequate in some circumstances, and they are susceptible of suffering thread damage from cross-threading, mishandling, over-torquing, and the like.

It is an object of the present invention to provide a fast, simple, and secure means of fastening two or more juxtaposed objects together which may be used as a viable alternative to the conventional fastening mean referred to above. It is another object of the present invention to provide fastener which is stronger than a threaded fastener such as a nut and bolt or screw, while not being susceptible to damage such as occurs with cross-threading or the like. It is yet another object of the invention to provide such a fastener having releasable means for establishing a flush-fitting, secure cap on the fastener in relation to the surrounding surface of at least one of the objects being fastened together. It is still a further object of the present invention to provide such a fastener for which the flush-fitting cap means may blend in, for example in color and/or texture, with the surrounding surface of the objects which are fastened together.

It is yet another object of the present invention to provide such a fastener which may be used quickly and efficiently to securely fasten together juxtaposed objects in, for example, the residential or commercial construction industry, with single or multiple units; in single or multiple story industrial applications such as buildings, bridges, or other structures; or in aircraft, spacecraft, boats, ships, or tanks or containment vessels for solids, liquids or other fluids.

SUMMARY OF THE INVENTION

The present invention accomplishes the foregoing objects, and attains other goals and advantages, by providing a slip lock pin and cap for fastening two or more juxtaposed objects together, wherein each of the objects has an outer surface and an opening extending therethrough, and each of the openings of the two outermost objects has an enlarged portion extending inwardly of those objects from their outer surfaces and a reduced portion extending from the enlarged portion through the object. There is a shoulder between each of the enlarged portions and the reduced portions. The openings in the objects are alignable with one another for receiving the slip lock pin and cap therewithin. The present invention includes a pin body insertable within the openings in the objects, that is, it "slips" into the openings, and having locking means on its opposite ends for lockingly engaging the shoulders of the two outermost objects for preventing separation of the objects from one another when the pin body is rotated a predetermined distance in the openings.

Cap means are provided and adapted to be mounted on the opposite ends of the pin body when the pin body has been rotated the predetermined amount. The cap means has anti-rotation means disposed thereon for extending into the objects' openings on opposite sides of the pin body for preventing rotation of the pin an amount sufficient to disengage the locking means from the shoulders. The cap means are substantially entirely received in the enlarged portions of the openings in the outermost objects such that the outer surfaces of the cap means are substantially flush with the outer surfaces of the objects connected together.

In a preferred embodiment, the mid-portion of the pin body is of substantially elongate cylindrical configuration, and the locking means includes a pair of diametrically opposed, transversely extending portions of the pin body at its opposite ends.

The cap means includes a body having an outer surface and an inner surface on the side opposite the outer surface, and an opening in the body extending inwardly from the inner surface. The opening receives an end of the pin body therewithin, i.e., the pin body "slips" into the opening, when the pin body has been rotated to engage the shoulders with the locking means. The anti-rotation means of the cap means includes extended portions protruding from its inner surface on opposite sides of its opening, and insertable into the openings in the objects on opposite sides of the pin body when the cap means is mounted thereon.

The pin body includes a groove around it near each terminal end, and the cap means opening includes a correlatively shaped portion inwardly of its inner surface and around at least a portion of its periphery for releasably lockingly engaging the groove and preventing, while engaged, removal of the cap means from the pin body. The outer end faces of the pin body have inwardly extending recesses, and the outer surfaces of the cap means have thin walled portions adjacent said recesses when the cap means is mounted on the pin body, for permitting rotation of the correlatively shaped portion of the cap means opening out of the groove of the pin body for releasing the locking engagement of the cap means from the pin body.

The shoulders between the enlarged portions and reduced portions of the openings in the objects have raised portions for anti-rotationally engaging the locking means of the pin body upon a predetermined amount of rotation of the pin body into the locked position.

BRIEF DESCRIPTION OF THE DRAWINGS

Further features of the preferred embodiment of the invention will become more readily apparent from the following detailed description, read in conjunction with reference to the following drawings, wherein:

FIG. 1 is an end view of the pin of the present invention;

FIG. 2 is a side view of the pin of the present invention;

FIG. 3 is a side view of the pin of FIG. 2, rotated 90° about its longitudinal axis;

FIG. 4 is an isometric view of the pin of the present invention;

DETAILED DESCRIPTION OF THE PREFERRED EMBODIMENT

Figure 5:
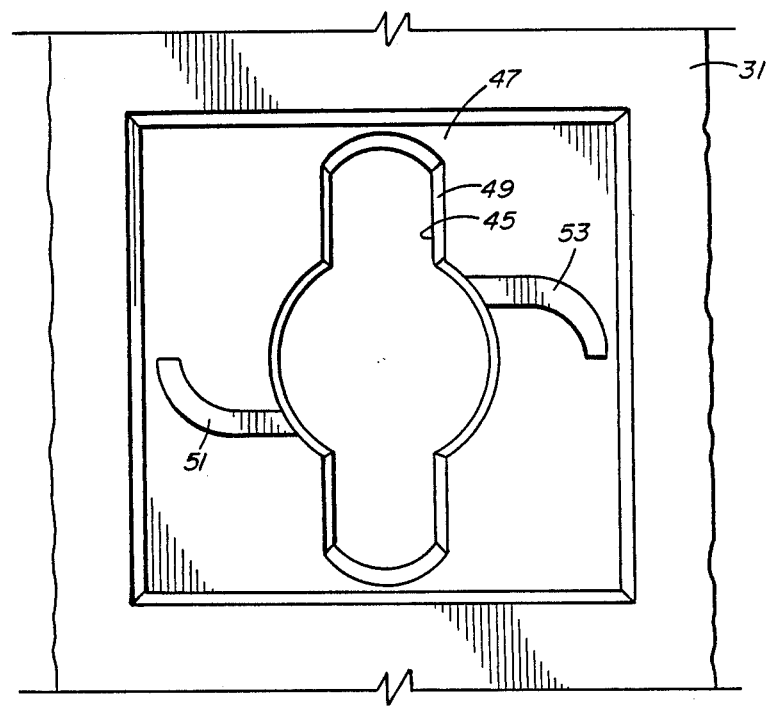
FIG. 5 is a front view of an opening in an object adapted to receive the slip lock pin and cap of the present invention.

Referring now to FIGS. 1–4, the pin 3 of the present invention includes a pin body 5 having a generally elongated cylindrical mid-portion 7 and locking means 9, 11 on its opposite ends. Locking means 9, 11 each comprise a pair of diametrically opposed, transversely extending or protruding portions or ears 13, 15 and 17, 19, respectively, which are integral with the pin body 5. Pin body 5 includes an inwardly extending, conical-shaped recess 21 on each end, substantially in the center of the ends of the pin body. Recesses 21 have a substantially circular profile at their openings in the end faces of pin body 5. The end faces of pin body 5 have a slightly outwardly protruding, frustoconical-type shape, as shown in FIGS. 2 and 3. Pin body 5 includes a groove 23 around its outer circumferential periphery near each end, between the protruding ears 13, 15 on one end of the pin body, from top and bottom (i.e., all the way around the pin body), and between protruding ears 17, 19 on the other end of the pin body, again all the way around the pin body. Grooves 23 continue around the inner periphery of ears 13, 15 and 17, 19 in the form of a notch 25 around said ears.

Figure 6:
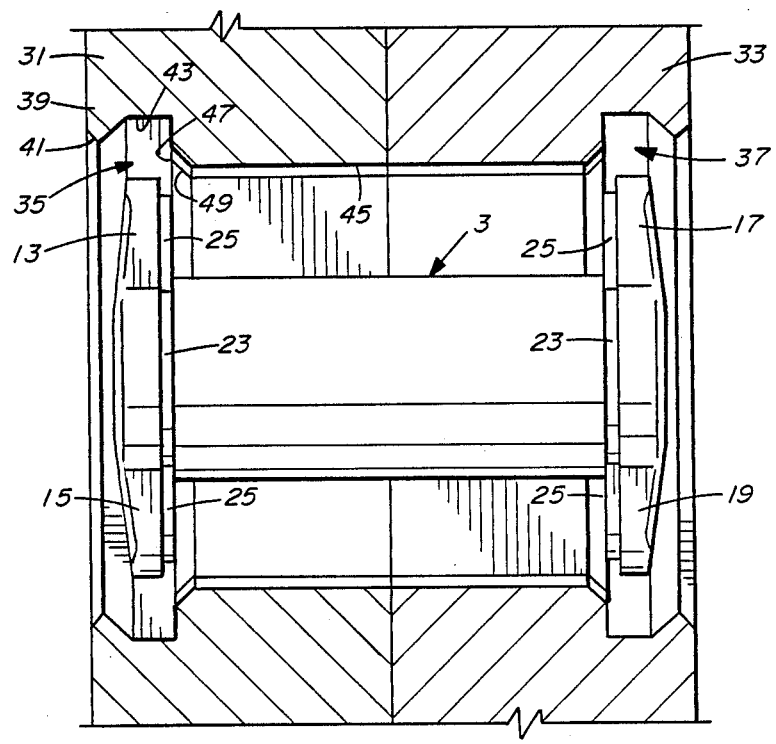
FIG. 6 is a cross sectional view showing the pin of the present invention inserted in aligned openings in a pair of juxtaposed objects prior to turning the pin and locking it against shoulders in the openings in the objects.

Referring now to FIGS. 5 and 6, there is shown in FIG. 6 a pair of juxtaposed objects 31, 33 to be connected together, and the pin 3 inserted in the aligned openings 35, 37 in the objects 31, 33, respectively, prior to turning and locking the pin, and in FIG. 5 one 31 of the pair of juxtaposed objects with an end-on view of the opening for receiving the pin and cap of the present invention. Object 31, which is mirrored in object 33, includes an outer surface 39 with a chamfered or beveled edge 41 around substantially square opening 35. Opening 35 includes an enlarged area 43 near surface 39, and a reduced area 45 inwardly of enlarged area 43, forming a shoulder 47 therebetween. The edge of shoulder 47 between it and reduced opening 45 is beveled or chamfered as shown at 49 to ease rotation of pin 3 as hereinafter described. Opening 45 is shaped to permit insertion of pin 3 into the space between objects 31, 33 as shown in FIG. 6, with ears 17, 19 being inserted first and in an upright (i.e., ears 17, 19 and 13, 15 are vertical, with reference to the drawings as laid out herein) position. Then, pin 3 is rotated 90° about its longitudinal axis, as shown now in FIGS. 7 and 8, until ears 17, 19 and 13, 15 abut a pair of raised stop members disposed on shoulders 47. The stop members for ears 13, 15 are shown at 51, 53 in FIG. 8, and serve as anti-rotation means for the pin, preventing its rotation beyond a 90° or quarter turn from its position in FIG. 6. When rotation occurs as shown in FIG. 8 in order to obtain the configuration of FIG. 7, objects 31, 33 are fastened together so long as pin 3 is not permitted to rotate back the 90°, because the ears now abut the surface of shoulder 47 at both ends of the pin. The great strength of the fastening means of the present invention arises due to the strength of the ears engaging the shoulders. This is believed to be greater than the strength of a comparably sized bolt and nut or screw. Rotation of pin 3 onto shoulders 47 is facilitated by beveled surface 49.

Figure 7:
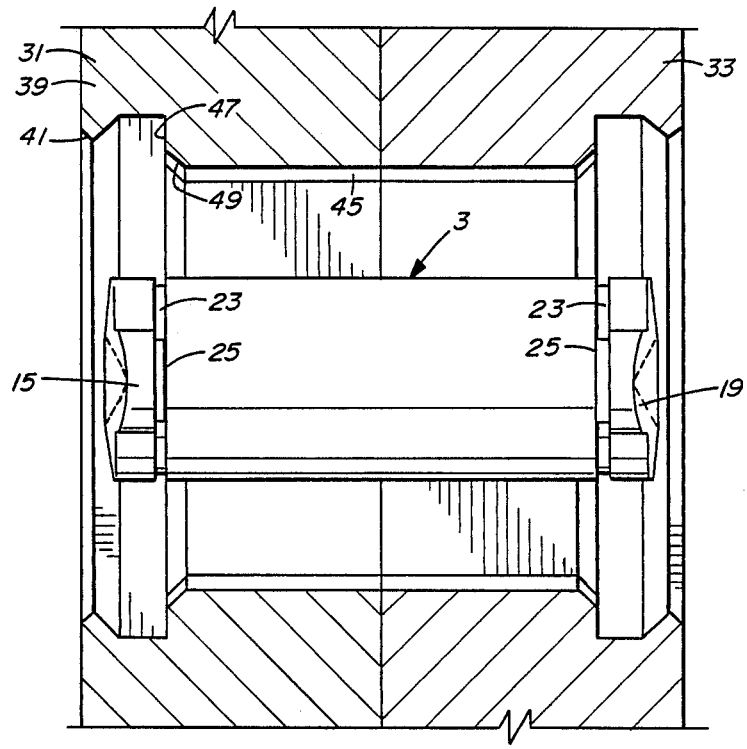
FIG. 7 is a view similar to FIG. 6, showing the pin rotated 90° to locked position.
Figure 8:
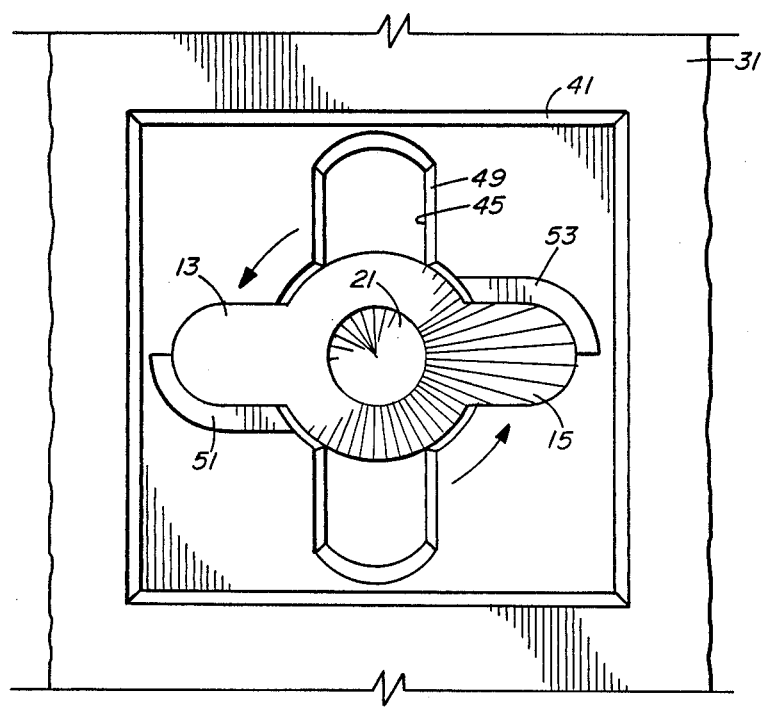
FIG. 8 is a view similar to FIG. 5, showing the pin in a locked position, the arrows showing the direction the pin was turned.
Figure 9:
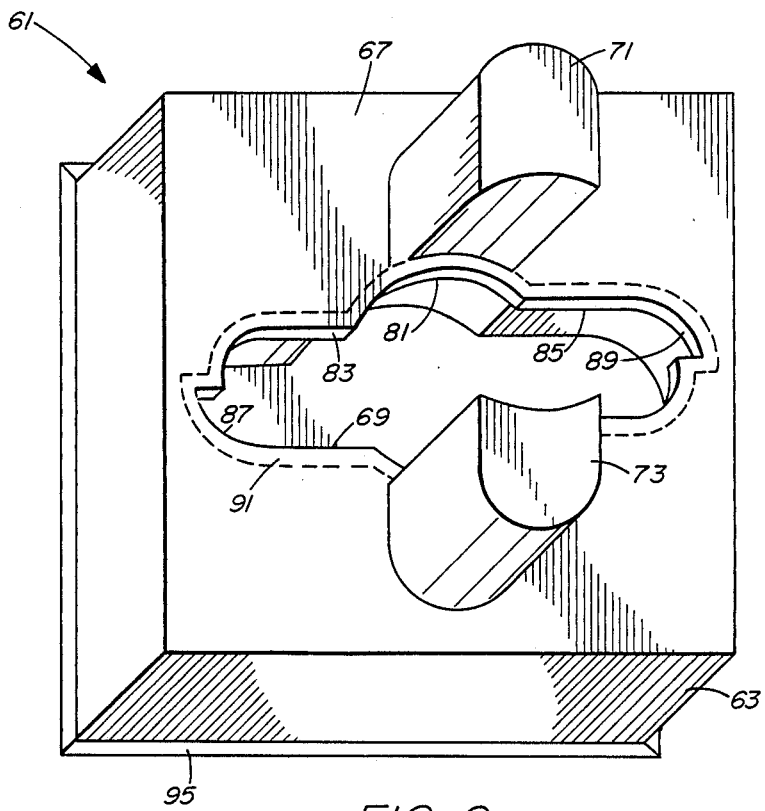
FIG. 9 is an isometric view showing the bottom or inner side of the cap.
Figure 10:
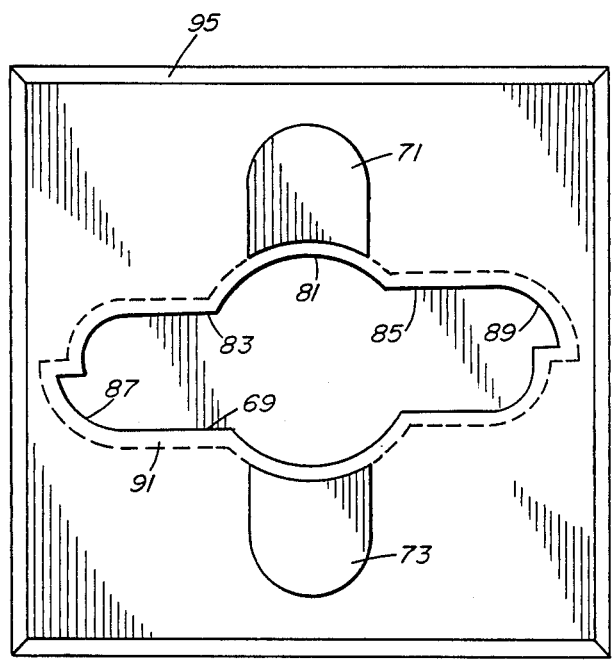
FIG. 10 is an end-on view of the bottom or inner side of the cap.
Figure 11:
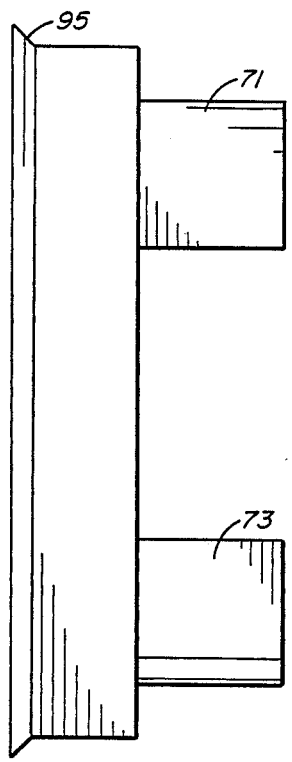
FIG. 11 is a side view of the cap.
Figure 12:
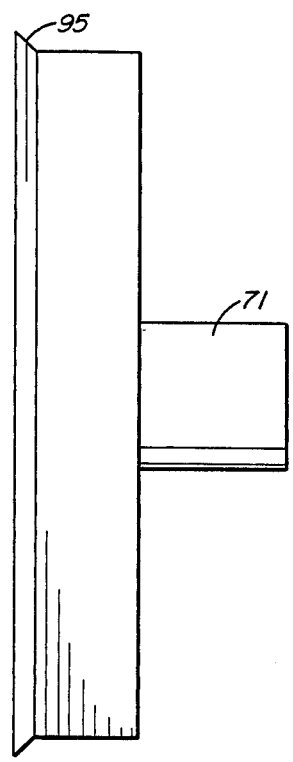
FIG. 12 is a side view of the cap similar to FIG. 11 but rotated 90° into or out of the page.
Figure 13:
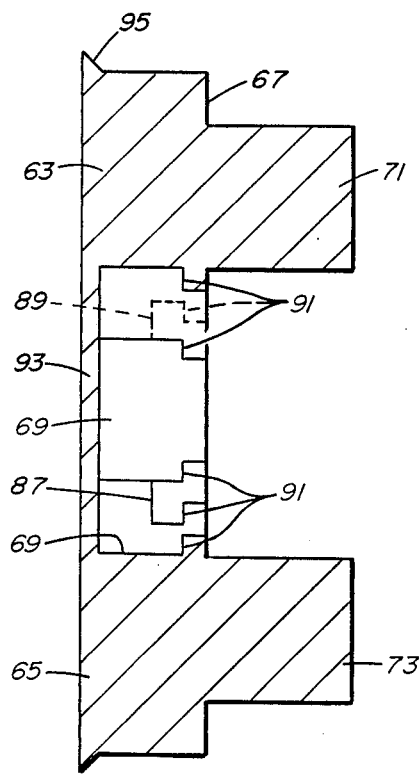
FIG. 13 is a sectional view of the cap in the orientation shown in FIG. 11.
Figure 14:
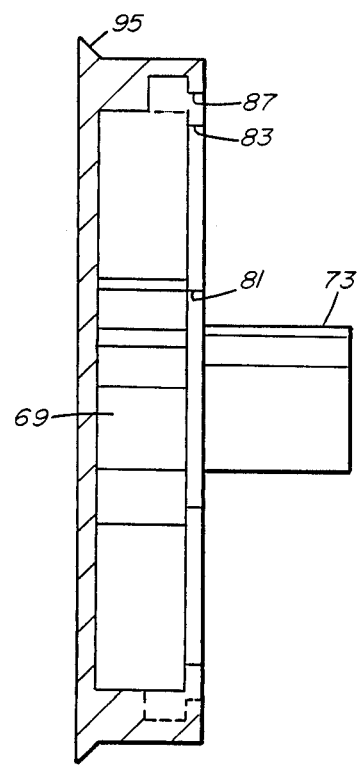
FIG. 14 is a sectional view of the cap in the orientation shown in FIG. 12.

Referring now to FIGS. 9, 10 and 13–15, there is shown the cap of the present invention indicated generally at 61, and its installation on the turned and locked pin of FIG. 7, securing the fastening together of objects 31, 33. Cap 61 includes a body 63 having an outer surface 65 and an inner surface 67, and an opening 69 extending inwardly from inner surface 67. Opening 69 receives the end of pin 3 therewithin when the pin body has been lockingly engaged with the shoulders 47. Cap 61 includes extended or protruding portions 71, 73 on its inner face or surface 67, on opposite sides of opening 69. Protruding portions 71, 73 extend into the openings 45 on opposite sides of pin 3 when cap 61 is placed on the pin in locked position, thereby preventing rotation of pin 3 and securing the fastening means of the present invention against rotation back to unlocked or released position.

In order to retain cap 61 on pin body 3, the opening 69 is shaped correlatively to the pin in locked position, having a central, circular-type opening portion 81 for receiving the circular cylindrical central portion of pin 3, extensions 83, 85 for receiving the ears 13, 15 and 17, 19 and jogs 87, 89 for receiving the stops 51, 53. A lip 91 extends around at least a portion of the periphery of opening 69 for engaging grooves 23, 25 and preventing the cap 61 from falling off pin 3. Each cap 61 includes a thin walled area 93, however, in the center of the outer surface 65 which is in register with the recesses 21 in the ends of pin body 3 when the caps are installed, enabling the thin walled areas 93 to be pressed into the recesses 21. Manipulation of thin walled areas 93 will rotate the lips 91 out of locking engagement with the pin, and will permit removal of the caps. Spreading the cap prior to installation by pressing on thin walled area 93 may also help in installing the invention more easily.

Figure 15:
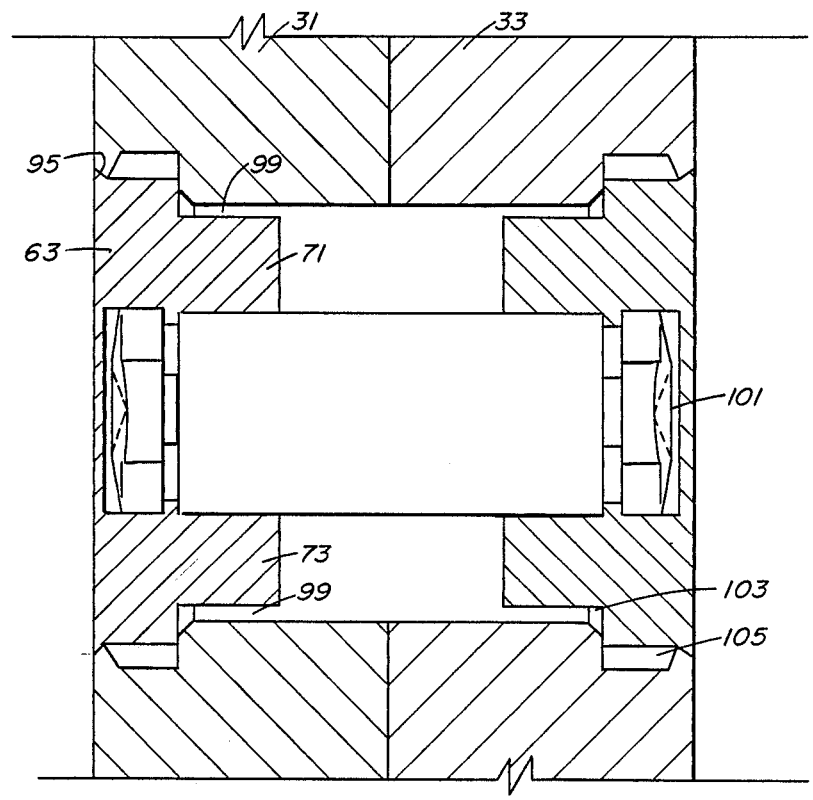
FIG. 15 is a cross sectional view showing the pin and cap of the present invention in finished, locked position in the openings in connected objects.
Figure 16:
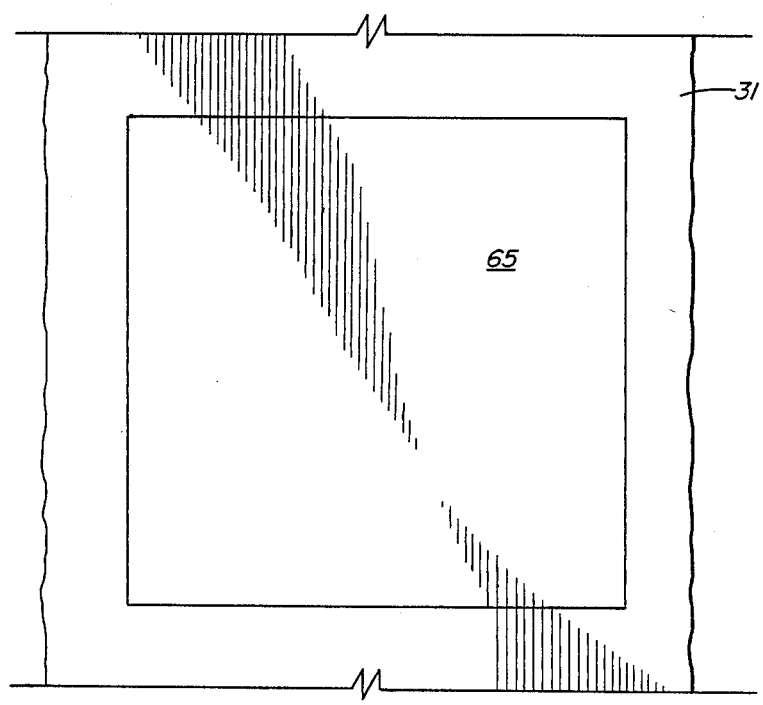
FIG. 16 is an end view of the cap of the present invention as installed, in finished position.

In the finished position shown in FIG. 15, main body 63 of cap 61 substantially fills the entire opening in object 31. The beveled or chamfered border 95 around the outer periphery of main body 63 mates with the chamfered area 41, creating a substantially smooth, flush, mating joint between surface 39 of object 31 and surface 65 of cap 61. A front or end-on view of this mating joint, i.e., of the cap 61 installed, is shown in FIG. 16.

Referring again to FIG. 15, note that there is some clearance area 99 between the wall of opening 45 and protruding members 71, 73, in order to allow for rotation of the cap locking means out of engagement with the pin. Note also that if a permanently locked fastener is desired, holes may be drilled as required in cap 61 in order to inject and fill areas 101, 103 and 105 with cement, epoxy, or other hardening material in order to prevent rotation of the lips 91 out of their mating grooves.

Of course, pin size, including length, mid-portion diameter, locking means width, and the like, and materials to be used for pin 3 and cap 61 will vary depending on the circumstances of use. Examples of materials which may be used for pin 3 include plastics, fiberglass, aluminum or aluminum alloys, steel, iron, copper, brass, and any other suitably strong, tough material. Cap 61 may be made of any suitable plastic material, or metal; it should be understood that if removal of the cap is desired, the body of the cap should have appropriate flexibility in order to permit rotation of the lips on the cap out of the grooves on the pin.

Because many different and varying embodiments of the invention are possible, and because modifications to the invention may be made without departing from its spirit, the scope of the invention should be ascertained by reference to the following claims.

I claim:

1. A slip lock pin and cap for fastening two or more juxtaposed objects together, wherein
   each of said objects has an outer surface and an opening extending therethrough, each of the openings of the two outermost of said objects has an enlarged portion extending inwardly of said objects from said outer surface and a reduced portion extending from said enlarged portion through said object, there being a shoulder between said enlarged portion and said reduced portion, said openings being alignable with one another for receiving said slip lock pin and cap therewithin, and including —
   a pin body insertable within said openings, said pin body having locking means on its opposite ends for lockingly engaging said shoulders of said two outermost objects for preventing separation of said objects from one another when said pin body is rotated a predetermined amount in said openings, the mid-portion of said pin body being of substantially elongate cylindrical configuration and said locking means including a pair of ears on each end of said pin body which protrude transversely of said mid-portion of said pin body, said ears at each end of said pin body being spaced diametrically opposite one another;
   cap means adapted to be mounted on said opposite ends of said pin body when said pin body has been rotated said predetermined amount, said cap means including a body having an outer surface and an inner surface on the side opposite said outer surface, and including an opening in said body of said cap means extending inwardly thereof from said inner surface of said cap means, said cap means opening receiving said opposite ends of said pin body therewithin when said pin body has been rotated to engage said shoulders with said locking means, said cap means having anti-rotation means disposed thereon comprising extended portions protruding from said inner surface on opposite sides of said cap means opening for extending into said openings in said objects on opposite sides of said pin body when said cap means is mounted thereon for preventing rotation of said pin body an amount sufficient to disengage said locking means from said shoulders, said cap means being substantially entirely received in said enlarged portions of the respective ones of said openings in said objects such that the outer surfaces of said cap means are substantially flush with said outer surfaces of said objects;
   a groove around said pin body near each terminal end thereof, and a correlatively shaped portion around the periphery of said opening in said cap means inwardly of said inner surface of said cap means for releasably lockingly engaging said groove of the respective end of said pin body and preventing removal of said cap means from said pin body; and
   inwardly extending recesses in the outer end faces of said ends of said pin body, and thin walled portions in the outer surfaces of said cap means adjacent said recesses when said cap means is mounted on said pin body, for permitting rotation of said correlatively shaped portions of said cap means out of said grooves of said pin body for releasing said releasably locking engagement of said cap means from said pin body.

2. Apparatus according to claim 1, wherein said openings in said objects include shaped portions to allow passage of said ears on said ends of said pin body through said openings, and said extended portions of said cap means protrude into the shaped portions of said openings when said cap means is mounted on said pin body.

3. Apparatus according to claim 1, wherein said shoulders between said enlarged portions and said reduced portions of said openings in said objects have raised portions for anti-rotationally engaging said ears of said pin body upon a predetermined amount of rotation of said pin body into the locked position.

* * * * *